A. BARDELL.
Fire-Shovel.

No. 203,991. Patented May 21, 1878.

Witnesses.
Otto Hufeland
Chas. Wahlers.

Inventor.
Alfred Bardell
by
Van Santvoord & Hauff
his attorneys

UNITED STATES PATENT OFFICE.

ALFRED BARDELL, OF BROOKLYN, E. D., NEW YORK.

IMPROVEMENT IN FIRE-SHOVELS.

Specification forming part of Letters Patent No. 203,991, dated May 21, 1878; application filed April 10, 1878.

*To all whom it may concern:*

Be it known that I, ALFRED BARDELL, of Brooklyn, E. D., in the county of Kings and State of New York, have invented a new and useful Improvement in Fire-Shovels, which invention is fully set forth in the following specification, reference being had to the accompanying drawing, in which—

Figure 1:
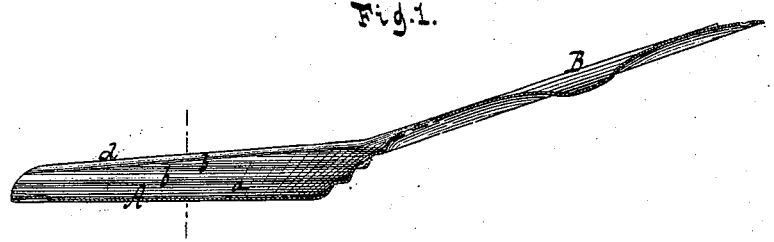
Figure 2:
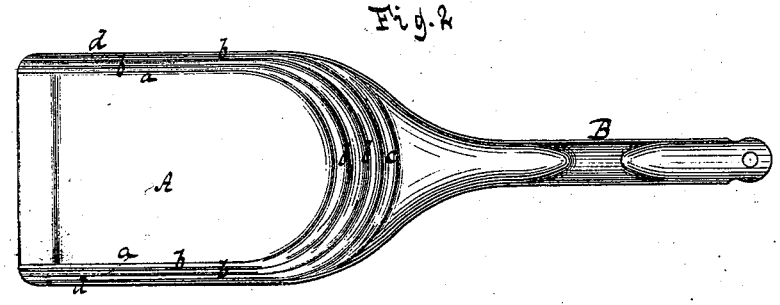
Figure 3:
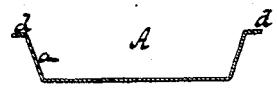
Figure 4:
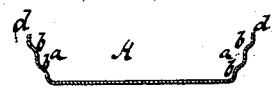

Figure 1 represents a longitudinal vertical section. Fig. 2 is a plan or top view. Fig. 3 is a transverse section before the shovel is finished. Fig. 4 is a similar section when the shovel is finished.

Similar letters indicate corresponding parts.

This invention relates to a fire-shovel the rim of which is made with one or more terraces running parallel to its blade, so that its stiffness and supporting strength is materially increased. The edge of the upper terrace is bent upward to form a vertical flange, which also extends along the sides of the handle, and serves particularly to strengthen the junction between the handle and the bowl of the shovel.

In the drawing, the letter A designates the bowl of my shovel, which, together with its handle B, is made out of one and the same piece of sheet metal; but, if desired, the handle may be made separate and secured to the bowl by rivets.

The rim $a$ of the bowl A is provided with one or more terraces, $b$, which extend along the sides of said rim and around its back in unbroken lines parallel to the bottom plate of the bowl. In the back part of the rim is an additional terrace, $c$. By means of these terraces the strength and stiffness of the shovel are materially increased, and a saving in stock can be effected, since I am enabled to use comparatively light or thin sheet metal in the manufacture of my shovels.

The edge $d$ of the upper terrace is bent up in a vertical direction, and it joins the upwardly-bent edge of the handle, so that the junction between the handle and the bowl is stiffened.

My shovel is struck up with suitable dies, and it is first formed in the manner shown in Fig. 3, the edge of the rim $a$ being turned out in a horizontal direction, so that the dies in forming the bowl with its terraces will be enabled to clamp said horizontal portion of the rim, thereby preventing the formation of wrinkles at the curved portions of the rim.

After the bowl has been formed, the edge $d$ is turned up, as shown in Fig. 4. This upwardly-turned edge assists in retaining ashes or coal in the bowl, and the terraces $b\ c$ impart to my shovel a novel and distinguishing appearance.

Fire-shovels prior to my invention have had their bottom or flat portions corrugated, for the purpose of imparting strength to such portion of the shovel. So, therefore, no claim to such is made herein.

What I claim as new, and desire to secure by Letters Patent, is—

1. As a new article of manufacture, a fire-shovel having a plain flat bottom, and provided with upturned sides, having a series of terraces extending in an unbroken line entirely around said sides, substantially as and for the purposes set forth.

2. In combination with the terraces extending in an unbroken line entirely around the sides of the shovel, the upwardly-turned edge extending into the handle, substantially as and for the purposes specified.

In testimony whereof I have hereunto set my hand and seal this 5th day of April, A. D. 1878.

ALFRED BARDELL. [L. S.]

Witnesses:
W. HAUFF,
E. F. KASTENHUBER.